United States Patent
Diono et al.

(10) Patent No.: US 8,828,454 B2
(45) Date of Patent: Sep. 9, 2014

(54) BASE, PRODUCTS CONTAINING THE SAME, PREPARATION METHODS AND USES THEREOF

(75) Inventors: Beatrice Diono, Saint-Andre-de-Cubzac (FR); Helge Ulmer, Bad Windsheim (DE); Swen Rabe, Muchlingen (DE)

(73) Assignee: Nestec S.A., Vevey (CH)

( * ) Notice: Subject to any disclaimer, the term of this patent is extended or adjusted under 35 U.S.C. 154(b) by 132 days.

(21) Appl. No.: 13/202,017

(22) PCT Filed: Feb. 18, 2009

(86) PCT No.: PCT/EP2009/051932
§ 371 (c)(1),
(2), (4) Date: Nov. 1, 2011

(87) PCT Pub. No.: WO2010/094327
PCT Pub. Date: Aug. 26, 2010

(65) Prior Publication Data
US 2012/0039930 A1    Feb. 16, 2012

(51) Int. Cl.
*A61K 36/00* (2006.01)
*A61K 36/06* (2006.01)
*A61K 8/96* (2006.01)
*A23L 1/23* (2006.01)
*A23L 1/227* (2006.01)

(52) U.S. Cl.
CPC *A23L 1/23* (2013.01); *A23L 1/2275* (2013.01)
USPC ................ 424/725; 424/195.16; 424/50

(58) Field of Classification Search
None
See application file for complete search history.

(56) References Cited

U.S. PATENT DOCUMENTS

| | | | | |
|---|---|---|---|---|
| 5,449,823 A | * | 9/1995 | Lerch | 562/577 |
| 5,573,926 A | * | 11/1996 | Gunata et al. | 435/74 |
| 6,013,289 A | * | 1/2000 | Blank et al. | 426/51 |

FOREIGN PATENT DOCUMENTS

| | | | |
|---|---|---|---|
| EP | 0490794 | | 6/1992 |
| EP | 1104654 | | 6/2001 |
| IN | 192846 | | 5/2004 |
| JP | 2003259835 | | 9/2003 |
| JP | 2005000157 | | 1/2005 |
| WO | 0130179 | | 5/2001 |
| WO | 0176391 | | 10/2001 |
| WO | 2007024111 | | 3/2007 |
| WO | WO2007024111 A | * | 3/2007 |
| WO | 2008133173 | | 11/2008 |
| WO | 2009114954 | | 9/2009 |

OTHER PUBLICATIONS

PCT International Search Report for Application No. PCT/EP2009/051932 with a Mailing Date of Nov. 27, 2009. 5 Pages.
Written Opinion for Application No. PCT/EP2009/051932 with a Mailing Date of Nov. 27, 2009.

* cited by examiner

*Primary Examiner* — Chris R Tate
*Assistant Examiner* — Russell Fiebig
(74) *Attorney, Agent, or Firm* — K&L Gates LLP

(57) ABSTRACT

The present invention concerns a base characterized in that it is prepared by the following steps: (a) partial bio-hydrolysis of raw materials rich in precursors, and (b) thermal reaction steps of the resulting product from (a). Said base can be prepared with a further step, which is a subsequent or simultaneous fermentation of the resulting product from step (a).

1 Claim, 2 Drawing Sheets

BASE, PRODUCTS CONTAINING THE SAME, PREPARATION METHODS AND USES THEREOF

FIELD OF THE INVENTION

The invention relates to a novel natural base, products containing the same, preparation methods and uses thereof. More particularly, it relates to a natural flavour base with intrinsic authentic signature flavour, which may be added as intermediate ingredient to recipes and delivers simultaneously Top and Middle-notes (aroma and taste) contributing mainly to the overall flavour tonality and haptic impressions of the final product, the culinary and confectionary products containing the same, methods for the manufacture of said base (combination of fermentation and thermal reaction treatment), and use of such culinary base for application in culinary, confectionary, cosmetics and beverage products.

BACKGROUND OF THE INVENTION

Generally, the flavour of a product is mainly generated through single ingredients representing Middle-notes (non-volatiles, such as body-givers, hydrolysates, yeast extracts, peptides, organic acids, phosphates, lipids, and so on) and Top-notes (volatiles, such as character impact compounds, e.g. roasty chicken aroma).

Most food forms use Top-notes that are often purchased from flavour houses to deliver authentic signature aromas and tonalities. However, using Top-notes results in several disadvantages as follows: Top-notes consist mainly of volatiles and therefore lack taste, depth, and body. To complete taste, flavour, depth, and body of the product, different items are needed in formulation which creates handling complexity at production sites.

Additionally, the use of purchased Top-notes is also commercially disadvantageous in that it makes it difficult to differentiate products from different producers.

There have not yet been natural bases which incorporate the combination of Top-notes and Middle-notes generated through biotransformation and thermal processing steps.

Recent studies have focused on this issue.

JP 2005000157 provides a fermented seasoning by using onion as a main raw material. This fermented seasoning is obtained by heat-treating vegetables containing onion, then adding malted cereals, common salt, and yeast to the vegetables, and further fermenting and ageing the vegetables. This invention does not use any precursors than onions and is not involving any thermal treatment to create specific signature flavors. This is quite like a process for the preparation of pickles or sour chili.

JP 2003259835 produces a plant material having an improved additional value by fermenting the plant material with micro-organisms such as lactic bacteria and yeasts, and also produces a useful food, cosmetic or the like from the product. This invention is as well fermentation with micro-organisms to provide longer shelf life stability and release ingredients from the plant cells, which can be used in skin care or food, but no signature flavour is produced.

The process of EP 0490794 includes separation of micro-organisms/harmful substances from fermentation reactions, and produces salty and/or grilled and/or roasted flavours. The method of the invention has no separation step, because the whole fermented paste is edible and can be consumed as such.

It would be advantageous to have a new base generating Middle-notes with Top-notes in one single ingredient. This base reduces the need to add single ingredients to the recipes, and make the producing process operable.

In addition, this base retains naturally authentic signature flavours increasing the independence from flavour houses, the brand recognition through more elaborated flavour tonality and differentiation of products from different suppliers. The new base opens the possibility to communicate naturalness and nutritional aspects to customers.

DETAILED DESCRIPTION OF THE INVENTION

The invention provides a new base, which generates Middle-notes and Top-notes in one single ingredient, i.e., a base with Middle and Top-notes giving signature flavour. This new base will simultaneously add aroma and taste to the final products, and is produced from raw materials using the combination of biotransformation processes and post- and/or pre-thermal treatment of raw materials.

Thus, more particularly, this invention relates to a novel natural base with intrinsic authentic signature flavour. This culinary base is a body-giver delivering distinctive savoury aroma, for example via Maggi lactones and/or sulphuric molecules and complex taste via for example amino acids, sugars, Maillard products, organic acids. It is produced through the combination of biotransformation processes and thermal treatment of natural raw materials, for example fenugreek, beans, lovage, celery, proteinaceous material from animal sources, which are rich in flavour precursors (e.g., sugars, Hydroxy-iso-leucine (HIL), Threonine, polypeptides etc.).

The objective of the invention is to have precursors available from bio-hydrolysis and/or fermentation (e.g., Hydroxy-iso-leucine (HIL), Threonine, etc.), amino acids and reducing sugars and to make them react together in a heating process, which is a thermal conversion step simultaneous with a Maillard reaction for aroma and taste generation.

In one embodiment, the base of the invention is prepared by the following steps:

(a) partial bio-hydrolysis of raw materials rich in precursors, and (b) thermal reaction steps of the resulting product from (a).

Figure 1:
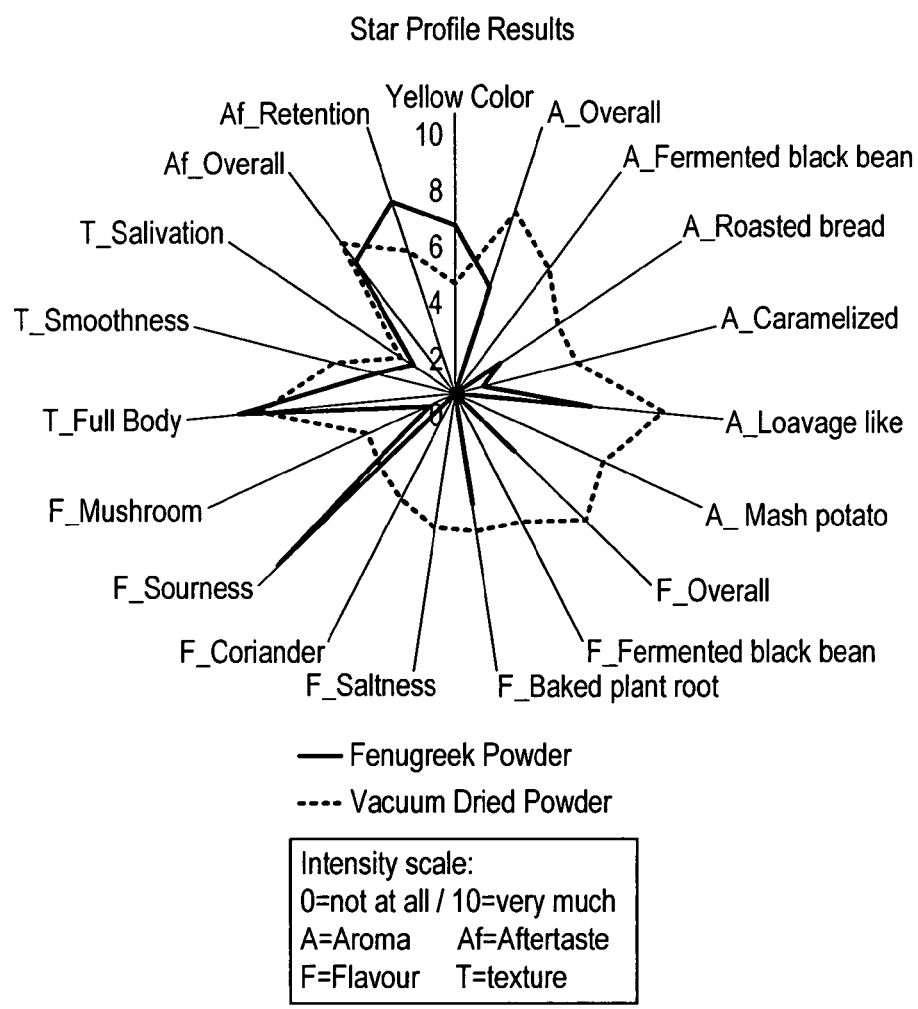
FIG. 1 is a spider web diagram depicting mid notes and top notes.

FIG. 1 is the characteristic spider web of the invention depicting the generation of Mid notes (F=Flavour) and Top notes (A=Aroma) for the inventive products:

The partial bio-hydrolysis (use enzyme and/or starter cultures) step of (a) can lyse the organic cells of the raw material and release precursors, amino acids, proteins, glycoproteins, etc. therein increases the yield of taste and aroma delivering molecules;

The enzyme used in this includes, but are not limited to all hydrolases, preferably lipase, protease, amylase, cellulase, most preferably protease and cellulase.

According to another feature of the invention, the base is prepared with a further step, which is a subsequent or simultaneous fermentation with starter cultures of the resulting product of step (a).

The raw materials rich in precursors used in this step include, but are not limited to any suitable material for culinary, confectionary, beverages, cosmetics, preferably the ones with precursors of Maggi signature flavour, such as traditional Asian ingredient, plants belonging to Allium family, most preferably fenugreek, beans, purple onion, lovage, celery, wheat gluten, yeast extract and *Ligusticum chuanxiong*.

If the raw material used for the base preparation does not contain enough sugar for the subsequent Maillard reaction, it is necessary to add at the beginning of the process a certain amount of sugar. Said sugar in not critical in the process and can be any type of sugar known by the man skilled in the art.

In the base of the invention, the precursors for Maillard reaction are those, including amino acids, reducing sugars, and for special tonalities, including Hydroxy-iso-leucine (HIL) for Sotolone and sulphur containing substances for chicken flavour. For example, the precursors are Methionine and Glutathione (sulfur containing compounds) or Hydroxy-iso-leucine.

The raw material of step (a) is selected from the group consisting of natural materials rich in amino acids, reducing sugars, precursors of sotolone, precursors of emoxyfurone and fatty acids. For example, the raw material of step (a) is selected from the group consisting of raw materials with high amounts of natural precursors, like precursors of sotolone and emoxyfurone. Fenugreek is such a raw material. The presence of fatty acids is for taste reasons and it is preferred to take natural fatty acids.

The starter microorganism(s) used in this fermentation step transforming plant precursors into natural mouth-coating, body-giving, volatile and non-volatile flavour compounds (e.g., organic acids, lipids, peptides, amino acids, esters), and thus produce multi-directional flavour bases; include, but are not limited to mould (e.g. *Aspergillus* ssp.), yeast (e.g. *Saccharomyces* ssp., *Torula* ssp.), bacterium (e.g. lactic acid bacteria, *Staphylococcus* ssp. and *Pediococcus* ssp.) and the mixture thereof, preferably *Aspergillus oryzae, Saccharomyces uvarum, Yarrowia lipolytica, Lactococcus casei, Lactobacillus rhamnosus, Lactococcus lactis*, and *Staphylococcus carnosus* and *Pediococcus acidilactici*, most preferably *Staphylococcus carnosus, Lactobacillus rhamnosus, Saccharomyces uvarum* and *Pediococcus acidilactici*.

The thermal treatment of step (b) includes sterilization and/or pasteurization, and transforms precursors (for example HIL and amino acids with reducing sugars to Sotolone and Strecker/Maillard products) and inactivates microbial starter and enzymes to reinforce and generate mid-note characters and control the extend of biotransformations and fixes the status of the product regarding stability and shelf life;

The base is prepared in step (b) at a temperature range from 45 to 131° C., preferably 60 to 125° C., most preferably 90 to 121° C.

The pH value employs in the methods of the invention ranges from 2.5 to 8.5, preferably 3 to 7 most preferably 3.2 to 6.8

The time of heating of the methods of the invention ranges from 2 min to 280 min, preferably 5 min to 120 min, most preferably 10 min to 30 min.

In another embodiment, the base of the invention is prepared by microbial fermentation and thermal treatment of raw materials rich in precursors simultaneously.

In another embodiment, the base of the invention is prepared in sequence by the following steps:
(1) partial bio-hydrolysis of raw materials rich in precursors,
(2) microbial fermentation and thermal treatment of the resulting product from (1) at the same time.

In another embodiment, the base of the invention is prepared in sequence by the following steps:

(1) partial bio-hydrolysis of raw materials rich in precursors,
(2) microbial fermentation of the resulting product from (1), and
(3) thermal treatment of the resulting product from (2).

According to one embodiment the base is prepared by the following steps:
(a) partial bio-hydrolysis of fenugreek at a temperature comprised between 20 and 60° C. for between 2 and 72 hours,
(a1) subsequent microbial fermentation of the resulting product from (1), wherein the used microorganism is $10^8$ cfu/ml *Lactococcus lactis* at 30° C. for 2 days, and
(b) heating the resulting product from (a1) at 90° C. for 5 min.

The producing process of the inventive base may also includes other steps than those mentioned herein, such as drying, adding water, and blending (preferably until forming gel) the raw material before and after partial bio-hydrolysis and/or microbial fermentation, thermal reaction before or after microbial fermentation, storing the resulting product from thermal reaction at 4° C. before application, etc. A dehydrated base needs additional salt (up to 15-40% w/w) before vacuum drying.

Further down stream steps can be frying, sautéing, pressure cooking, boiling. For dehydration of the base addition of salt (2-40% w/w) before vacuum and/or spray drying is needed.

Therefore, the base of the invention has flexibility and efficiency in use (one ingredient with low sodium content) as well as built-in safety through natural preservatives (Allium, lactic acetate, acetic acetate, bacteriocines, etc.) and low pH (lactic and acetic acid fermentation), and has lingering and texturising effects derived from natural gums (either from polysaccharides from starter culture or compound of raw materials).

The invention further relates to the preparing process of the base of the invention with following steps:
(a) partial bio-hydrolysis of raw material rich in precursors,
(b) thermal reaction steps of the resulting product from (a).

As already said before, it is also possible to add a fermentation step subsequent or simultaneously with the bio-hydrolysis.

The invention also relates to the culinary and confectionary products containing the base of the invention. Preferably, said product contains between 1 and 95% of the base. Preferably, the amount of the base is comprised between 5 and 80%.

In another aspect, the invention relates to the use of the base of the invention for application in confectionary (candy, jam, chocolate, etc.), culinary products, beverages and cosmetics as an ingredient to have special flavour (taste and aroma) or providing special pasty texture.

In addition, some starter micro-organisms (e.g., lactic acid bacteria) can generate potent natural antimicrobials (bacteriocines) that add intrinsic safety to the product and thereby can contribute to communication on naturalness and ease process handling. Optionally, the method of the invention further comprises: blending of base, Middle-, and Top-notes and/or a heating step for further Maillard reactions.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

Throughout the description and claims of this specification, the words "comprise" and "contain" and variations of the words, for example "comprising" and "comprises", mean "including but not limited to", and are not intended to (and do not) exclude other moieties, additives, components, integers or steps.

In this specification, the following terms have the following meanings.

The term "Top-note(s)" as used herein means everything you can smell, and includes aroma delivering volatiles, smell characteristics, retro nasal detectable compounds, but is not limited to Sotolone (3-Hydroxy-4,5-dimethylfuran-2(5H)-on).

The term "Middle-note (s)" as used herein means everything which has a tonality and direction already in taste, and includes, the taste of hydrolysates and biohydrolysates, yeast extracts, chicken meat powder, beef powder, pork powder, hydrolysed pork bones, chicken, beef, pork, brothy, roasty, worty and is not limited to Maggi signature (lovage) taste.

The term "natural base" as used herein means products created from natural raw materials without introducing any artificial generated materials during processing steps. The processing steps include, but are not limited to fermentation, hydrolysing, heating steps.

The term "Maggi base" as used herein includes flavouring bases in liquid, dried, and pasty form made from ingredients, comparable the ones used in kitchen but is not limited to a natural culinary base with authentic Maggi signature flavour. It will be added as an intermediate product to recipes. At the moment, Top-notes deliver the Maggi signature aroma for Maggi products.

The term "sugars" as used herein includes sucrose, glucose, fructose, maltose, iso-maltose, xylose, lactose, trehalose and mono-disaccharides, which are fermented during application of specific starter culture and/or reacted through Maillard and Strecker reaction.

All references to percentages are percentages by weight unless otherwise stated.

Further aspects and embodiments of the disclosure are set forth in the following description and claims.

Example 1

Mill fresh fenugreek (LF) and onion and sun dry it for 5 days. Add water into the mixture of LF powder (5%), fresh purple onion (50%) and sucrose (10%) to obtain a dry matter content of 8%. Pasteurize the mixture at 90° C. for 30 min. 1% of starter culture (*Lactococcus lactis:* $10^8$ cfu/ml) is added into the mixture above which is then fermented at 30° C. for 2 days. The pH will drop below 4.5. After fermentation, the mixture is heated at 90° C. for 5 min.

Example 2

Simmer fresh milled spring onion fenugreek with water for 2 h, sucrose (60%) is then added to obtain a dry matter content of 40%. 5% of starter culture (*Lactobacillus delbrueckii+Saccharomyces cerevisiae:* $10^8$ cfu/ml and $10^6$ cfu/ml, respectively) is added into the mixture above which is then fermented at 30° C. for 2 days. The pH will drop below 4.0 afterwards. After fermentation, the mixture is heated at 75° C. for 5 min, and added into commodities as an ingredient to have special flavor (taste and aroma).

Example 3

Add water into the mixture of fresh milled *Ligusticum chuanxiong* and fenugreek (15% w/w), sucrose (60%) to obtain a dry matter content of 10%. 0.5% of Lipase is then added into the mixture. Hydrolyze the mixture at 60° C. for 6 h and inactive enzyme at 90° C. for 15 min afterwards. Later on, 1% of starter culture (i.e., *Staphylococcus carnosus:* $10^8$ cfu/ml) is added into the mixture above which is then fermented at 30° C. for 2 days. The pH drops below 4.0. After fermentation, the mixture is heated at 90° C. for 5 min.

Example 4

Add water into the mixture of fenugreek extract (15% w/w), fresh purple onion (50%) and the sugar mixture which includes sucrose (2% w/w), maltose (1.5% w/w), fructose (2% w/w), oligomaltose (2% w/w), lactose (2% w/w), glucose (2% w/w). 0.5% of hydrolases are then added to the mixture. Hydrolyze the mixture at 60° C. for 6 h and inactive enzyme at 90° C. for 15 min afterwards. Later add 1% of starter culture (*Lactococcus* ssp.+*Saccharomyces uvarum:* $10^8$ cfu/ml) is added into the mixture above which is then fermented at 30° C. for 2.5 days. The pH drops below 4.0 afterwards. After fermentation, the mixture is heated at 90° C. for 10 min.

Example 5

Add water into the mixture of plant material high in Emoxyfurone and precursor of fenugreek extract and *Ligusticum chuanxiong* powder; add sucrose to obtain a dry matter content of 20%. Cook at 90° C. for 30 min. Add 0.5% of Amylase, 0.5% of cellulase and 1% of starter culture (e.g. *Bifidobacterium adolescentis:* $10^8$ cfu/ml). Ferment the mixture above and hydrolyze at the same time at 30° C. for 2 days. The pH drops below 4.0. After fermentation and hydrolysis, the mixture is heated at 90° C. for 10 min.

Example 6

Simmer fresh milled cocoa beans with water for 2 h, sugars (60%) is added to obtain a dry matter content of 40%. 5% of starter culture (*Lactobacillus delbrueckii+Saccharomyces cerevisiae+Lactobacillus amylovorans* and *Saccharomyces diastaticus* and *Lactobacillus sanfranciscensis*), where $10^8$ cfu/ml for the lactic acid fermenters and $10^6$ cfu/ml for the yeast is added into the mixture above which is then fermented at 30° C. for 2 days. The pH will drop below 4.0 afterwards. After fermentation, the mixture will be heated at 75° C. for 5 min and 90° C. for 5 min and added into commodities as an ingredient to have special flavor (taste and aroma).

Example 7

Simmer fresh milled rice malt and black beans with water for 2 h, sugars (60%) is added to obtain a dry matter content of 40%. 5% of starter culture (*Lactobacillus plantarum+Lactobacillus amylovorans:* $10^8$ cfu/ml for the lactic acid fermenters) is added into the mixture. Add 0.5% of Protease and 0.5% of Cellulase. Ferment above then 30° C. for 2 days. The pH will drop below 4.0 afterwards. After fermentation, the mixture will be heated at 75° C. for 5 min and 90° C. for 5 min and added into commodities as an ingredient to have special flavor (taste and aroma).

Example 8

Figure 2:
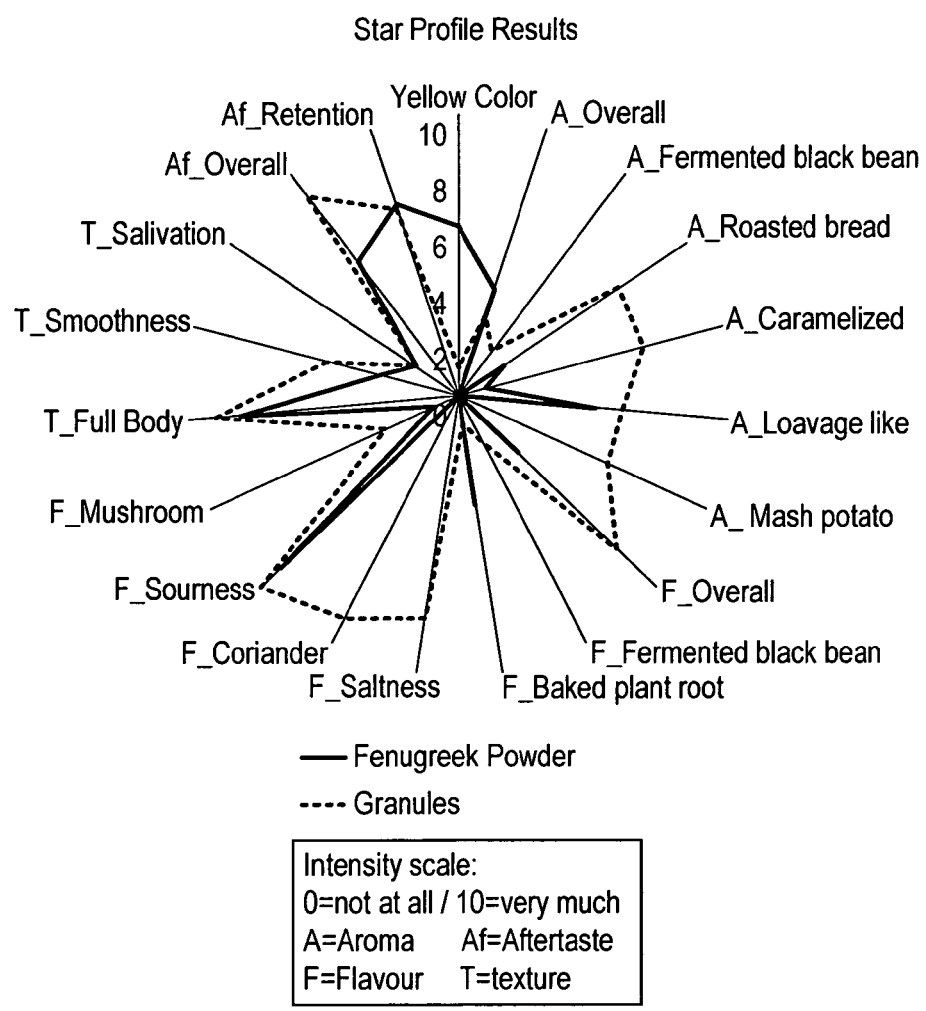
FIG. 2 is a spider web diagram depicting mid notes and top notes.

Simmer fenugreek powder, *Ligusticum chuanxiong* and black beans with water for 50 h, sugars (40%) is added to obtain a dry matter content of 40%. 5% of starter culture (*Lactobacillus rhamnosus*+*Aspergillus oryzae:* $10^8$ cfu/ml) is added into the mixture. Add 0.5% of Cellulase. Ferment above then 30° C. for 2 days. The pH will drop below 4.0 afterwards. After fermentation, the mixture will be heated at 75° C. for 5 min and 90° C. for 5 min and then salt (max. 15%) will be added into mixture to get granules. FIG. 2.

The invention claimed is:

1. A flavor base for flavoring food, prepared by the following steps:
    (a) partially bio-hydrolyzing whole fenugreek (*Trigonella foenum-graecum*) at a temperature of between 20 and 60° C. for between 2 and 72 hours to produce a partially hydrolyzed product,
    (b) microbially fermenting the partially hydrolyzed product of step (a) using $10^8$ cfu/mL of *Lactococcus lactis* at 30° C. for 2 days to produce a fermented product, and
    (c) heating the fermented product of step (b) at 90° C. for 5 minutes to produce the flavor base.

\* \* \* \* \*